(12) United States Patent
Sheraizin et al.

(10) Patent No.: US 7,903,902 B2
(45) Date of Patent: Mar. 8, 2011

(54) ADAPTIVE IMAGE IMPROVEMENT

(76) Inventors: Semion M. Sheraizin, Mazkeret Batya (IL); Vitaly S. Sheraizin, Mazkeret Batya (IL)

( * ) Notice: Subject to any disclaimer, the term of this patent is extended or adjusted under 35 U.S.C. 154(b) by 920 days.

(21) Appl. No.: 10/898,557

(22) Filed: Jul. 26, 2004

(65) Prior Publication Data
US 2006/0034512 A1 Feb. 16, 2006

(51) Int. Cl.
*G06K 9/36* (2006.01)
(52) U.S. Cl. ......... 382/274; 382/260; 382/266; 382/275; 358/3.26; 358/3.27; 358/463
(58) Field of Classification Search .............. 382/260, 382/274, 275, 266; 358/3.26, 327, 463
See application file for complete search history.

(56) References Cited

U.S. PATENT DOCUMENTS

| | | |
|---|---|---|
| 2,697,758 A | 8/1950 | Little, Jr |
| 3,961,133 A | 6/1976 | Bennett |
| 4,855,825 A | 8/1989 | Haikonen et al. |
| 4,947,255 A | 8/1990 | Jackson et al. |
| 5,012,333 A | 4/1991 | Lee et al. |
| 5,126,847 A | 6/1992 | Kori |
| 5,194,943 A | 3/1993 | Tomita et al. |
| 5,245,445 A | 9/1993 | Fujisawa |
| 5,301,016 A | 4/1994 | Gehrmann |
| 5,339,171 A | 8/1994 | Fujisawa et al. |
| 5,341,442 A | 8/1994 | Barrett |
| 5,384,601 A | 1/1995 | Yamashita et al. |
| 5,404,174 A | 4/1995 | Sugahara |
| 5,428,398 A | 6/1995 | Faroudja |
| 5,467,404 A | 11/1995 | Vuylsteke et al. |
| 5,488,675 A | 1/1996 | Hanna |
| 5,491,514 A | 2/1996 | Fukuda |
| 5,491,517 A | 2/1996 | Kreitman et al. |
| 5,491,519 A | 2/1996 | Kim |
| 5,510,824 A | 4/1996 | Nelson |
| 5,537,510 A | 7/1996 | Kim |
| 5,539,475 A | 7/1996 | Sadjadian et al. |
| 5,542,008 A | 7/1996 | Sugahara et al. |
| 5,555,557 A | 9/1996 | Mailloux |
| 5,557,340 A | 9/1996 | Millward |
| 5,565,921 A | 10/1996 | Sasaki et al. |
| 5,566,251 A | 10/1996 | Hanna et al. |
| 5,586,200 A | 12/1996 | Devaney et al. |

(Continued)

FOREIGN PATENT DOCUMENTS

EP 0502615 9/1992

(Continued)

OTHER PUBLICATIONS

Banhom, et al, "Digital Image Restoration", IEEE Signal Proc, pp. 24-41, Mar. 1997.

(Continued)

*Primary Examiner* — Yosef Kassa

(57) ABSTRACT

A method includes analyzing an input image at least to determine locations of human skin in the input image and processing the input image at least to improve, on a per pixel basis, the areas of human skin of the input image. Another method included in the present invention includes measuring blurriness levels in an input image; and processing the input image with the blurriness levels at least to sharpen the input image. A third method includes identifying areas of at least bright light in an input image and changing the sharpness of the input image as a function of exposure level of different areas of the input image.

17 Claims, 5 Drawing Sheets

U.S. PATENT DOCUMENTS

| | | | |
|---|---|---|---|
| 5,592,226 A | 1/1997 | Dickenson et al. | |
| 5,613,035 A | 3/1997 | Kim | |
| 5,614,937 A | 3/1997 | Nelson | |
| 5,627,580 A | 5/1997 | Nelson | |
| 5,627,937 A | 5/1997 | Kim | |
| 5,648,801 A | 7/1997 | Beardsley et al. | |
| 5,653,234 A | 8/1997 | Kim et al. | |
| 5,694,492 A | 12/1997 | Kim | |
| 5,717,463 A | 2/1998 | Brailean et al. | |
| 5,774,593 A | 6/1998 | Zick et al. | |
| 5,787,203 A | 7/1998 | Lee et al. | |
| 5,790,195 A | 8/1998 | Ohsawa | |
| 5,796,864 A | 8/1998 | Callahan | |
| 5,799,111 A | 8/1998 | Guissin | |
| 5,828,776 A * | 10/1998 | Lee et al. | 382/133 |
| 5,838,835 A | 11/1998 | Martens | |
| 5,844,607 A | 12/1998 | Gebler et al. | |
| 5,845,012 A | 12/1998 | Jung | |
| 5,847,766 A | 12/1998 | Peak | |
| 5,847,772 A | 12/1998 | Wells | |
| 5,850,294 A | 12/1998 | Apostolopoulos et al. | |
| 5,852,475 A | 12/1998 | Gupta et al. | |
| 5,870,501 A | 2/1999 | Kim | |
| 5,881,174 A | 3/1999 | Kim | |
| 5,881,614 A | 3/1999 | Chong et al. | |
| 5,883,983 A | 3/1999 | Lee et al. | |
| 5,901,178 A | 5/1999 | Lee et al. | |
| 5,914,748 A | 6/1999 | Parulski | |
| 5,974,159 A | 10/1999 | Lubin et al. | |
| 5,982,926 A | 11/1999 | Kuo et al. | |
| 5,991,464 A | 11/1999 | Hsu et al. | |
| 5,995,656 A | 11/1999 | Kim | |
| 6,005,626 A | 12/1999 | Ding | |
| 6,014,172 A | 1/2000 | Niesen | |
| 6,037,986 A | 3/2000 | Gouliardon | |
| 6,055,340 A | 4/2000 | Nagao | |
| 6,094,511 A * | 7/2000 | Metcalfe et al. | 382/260 |
| 6,097,848 A | 8/2000 | Salvati | |
| 6,100,625 A * | 8/2000 | Yamamoto | 310/328 |
| 6,130,723 A | 10/2000 | Medin | |
| 6,191,772 B1 | 2/2001 | Mical et al. | |
| 6,229,925 B1 | 5/2001 | Alexandre et al. | |
| 6,236,751 B1 | 5/2001 | Farrell | |
| 6,259,489 B1 | 7/2001 | Flannaghan et al. | |
| 6,282,299 B1 | 8/2001 | Tewfik et al. | |
| 6,320,676 B1 | 11/2001 | Yoshidome | |
| 6,366,705 B1 | 4/2002 | Chiu et al. | |
| 6,385,647 B1 | 5/2002 | Willis et al. | |
| 6,404,460 B1 | 6/2002 | Chen et al. | |
| 6,463,173 B1 | 10/2002 | Tretter | |
| 6,466,912 B1 | 10/2002 | Johnston | |
| 6,473,532 B1 | 10/2002 | Sheraizin et al. | |
| 6,509,158 B1 * | 1/2003 | Schwartz | 435/6 |
| 6,522,425 B2 | 2/2003 | Yoshidome | |
| 6,554,181 B1 * | 4/2003 | Dammers et al. | 229/125.04 |
| 6,559,826 B1 | 5/2003 | Mendelson et al. | |
| 6,567,116 B1 * | 5/2003 | Aman et al. | 348/169 |
| 6,580,825 B2 | 6/2003 | Bhaskar | |
| 6,610,256 B2 * | 8/2003 | Schwartz | 422/186 |
| 6,628,327 B1 | 9/2003 | Aoki et al. | |
| 6,643,398 B2 | 11/2003 | Moriwaki | |
| 6,707,487 B1 * | 3/2004 | Aman et al. | 348/169 |
| 6,728,317 B1 | 4/2004 | Demos | |
| 6,753,929 B1 | 6/2004 | Sheraizin et al. | |
| 6,757,449 B1 | 6/2004 | Loce | |
| 6,782,287 B2 * | 8/2004 | Grzeszczuk et al. | 600/424 |
| 6,835,693 B2 | 12/2004 | Bourdelais et al. | |
| 6,845,181 B2 | 1/2005 | Dupin et al. | |
| 6,847,391 B1 * | 1/2005 | Kassatly | 348/14.01 |
| 6,873,442 B1 | 3/2005 | Gindele et al. | |
| 6,940,545 B1 | 9/2005 | Ray et al. | |
| 6,940,903 B2 | 9/2005 | Zhao et al. | |
| 6,970,506 B2 | 11/2005 | Kim et al. | |
| 7,003,174 B2 * | 2/2006 | Kryukov et al. | 382/266 |
| 7,049,074 B2 * | 5/2006 | Schwartz | 435/6 |
| 7,050,961 B1 * | 5/2006 | Lee et al. | 703/22 |
| 7,075,993 B2 * | 7/2006 | O'Brien, Jr. | 375/240.27 |
| 7,087,021 B2 * | 8/2006 | Paternostro | 600/443 |
| 7,110,601 B2 * | 9/2006 | Yanagisawa et al. | 382/181 |
| 7,112,762 B2 * | 9/2006 | Finley et al. | 219/201 |
| 7,124,041 B1 * | 10/2006 | Johnson et al. | 702/58 |
| 7,133,451 B2 | 11/2006 | Kim et al. | |
| 7,139,425 B2 | 11/2006 | Takahashi | |
| 7,164,717 B2 | 1/2007 | Katsavounidis et al. | |
| 7,181,370 B2 * | 2/2007 | Furem et al. | 702/188 |
| 7,184,071 B2 * | 2/2007 | Chellappa et al. | 348/46 |
| 7,221,706 B2 | 5/2007 | Zhao et al. | |
| 7,221,805 B1 * | 5/2007 | Bachelder | 382/255 |
| 7,526,142 B2 | 4/2009 | Sheraizin et al. | |
| 7,639,892 B2 | 12/2009 | Sheraizin et al. | |
| 7,742,108 B2 | 6/2010 | Sheraizin et al. | |
| 7,805,019 B2 | 9/2010 | Sheraizin et al. | |
| 2001/0000354 A1 | 4/2001 | Nazerian et al. | |
| 2002/0015508 A1 | 2/2002 | Hannigan et al. | |
| 2002/0122494 A1 | 9/2002 | Sheraizin | |
| 2002/0104854 A1 | 10/2002 | Lan | |
| 2002/0181598 A1 | 12/2002 | Vetro et al. | |
| 2003/0107681 A1 | 6/2003 | Otawara et al. | |
| 2003/0122969 A1 | 7/2003 | Higuchi | |
| 2003/0152283 A1 | 8/2003 | Moriwaki | |
| 2004/0091145 A1 | 5/2004 | Kohashi et al. | |
| 2004/0184673 A1 | 9/2004 | Watanabe | |
| 2004/0190789 A1 | 9/2004 | Liu et al. | |
| 2005/0013485 A1 | 1/2005 | Masaki | |
| 2005/0259185 A1 | 11/2005 | Kim et al. | |
| 2006/0013503 A1 | 1/2006 | Kim | |
| 2009/0161754 A1 | 6/2009 | Sheraizin et al. | |
| 2010/0225817 A1 | 9/2010 | Sheraizin et al. | |

FOREIGN PATENT DOCUMENTS

| | | |
|---|---|---|
| EP | 0729117 | 8/1996 |
| GB | 1503612 | 3/1978 |
| JP | 55-71363 | 5/1980 |
| JP | 6-133221 | 7/1985 |
| JP | 01206775 | 8/1989 |
| JP | 4-83480 | 3/1992 |
| JP | 08-191440 | 7/1996 |
| WO | WO 00/19726 | 4/2000 |

OTHER PUBLICATIONS

Belkacem-Boussaid, et al., "A New Image Smoothing Method Based on a Simple Model of Spatial Processing in the Early Stages of Human Vision", IEEE Trans. on Image Proc., vol. 9, No. 2, p. 220-226, Feb. 2000.

Pappas, et al., "Digital Color Restoration of Old Paintings", IEEE Trans. On Image Proc., vol. 9, No. 2, pp. 291-294, Feb. 2000.

Kim, et al., "Impact of HVS Models on Model-based Halftoning", IEEE Trans. on Image Proc., vol. 11, No. 3, pp. 258-269, Mar. 2002.

Hentschel, et al., "Effective Paking Filter and Its Implementation on a Programmable Architecture", IEEE Trans. On Consumer Electronics, vol. 47, No. 1, pp. 33-39, Feb. 2001.

Yang, et al., "Maximum-Likelihood Parameter Estimation for Image Ringing-Artifact Removal", IEEE Trans. on Circuits and Systems for Video Technology, vol. 11, No. 8, pp. 963-973, Aug. 2001.

Immerkaer, "Use of Blur-Space of Deblurring and Edge-Preserving Noise Smoothing", IEEE Trans. On Image Proc., vol. 10, No. 6, pp. 837-840, Jun. 2001.

Chan, et al., "The Digital TV Filter and Nonlinear Denoising", IEEE Trans, on Image Proc., vol. 10, No. 2, pp. 231-241, Feb. 2001.

Liu, et al., "Complexity-Regularized Image Denoising", IEEE Trans. on Image Processing, vol. 10, No. 6, pp. 341-351, Jun. 2001.

Jostschulte, et al., "Perception Adaptive Temporal TV-noise Reduction Using Contour Preserving Prefilter Techniques", IEEE on Consumer Electronics, vol. 44, No. 3, pp. 1091-1096, Aug. 1998.

Brice, Richard "Multimedia and Virtual Reality Engineering", (1997),1-8, 174-175, 280-283.

Conway, Lynn et al., "Video mirroring and Iconic Gestures: Enhancing Basic Videophones to Provide Visual Coaching and Visual Control", *IEEE Transactions on Consumer Electronics*, vol. 44, No. 2,(May 1998),388-397.

Chang, Dah-Chung "Image contrast enhancement based on local standard deviation", *IEEE trans on medical imaging*, vol. 17, No. 4,(Aug. 1998),518-531.

Kim, Yeong T., "Contrast enhancement using brightness preserving bihistogram equalization", *IEEE trans on consumer electronics*, vol. 43, No. 1, (Feb. 1997),1-8.

Kim, Tae K., et al., "Contrast enhancement system using spatially adaptive histogram equalization with temporal filtering", *IEEE trans on consumer electronics*, vol. 44, No. 1,(Feb. 1998),82-87.

Sakaue, Shigeo et al., "Adaptive gamma processing of the video camera for expansion of the dynamic range", *IEEE trans on consumer electronics*, vol. 41, No. 3,(Aug. 1995),555-582.

Russ, John C., "The image processing handbook", *CRS press Inc.*, (1995),674.

Talluri, Raj et al., "A Robust, Scalable, Object-Based Video Compression Technique for Very Low Bit-Rate Coding", *IEEE Transaction of Circuit and Systems for Video Technology*, (Feb. 1997),vol. 7 , No. 1.

Awadkh, Al-Asmari "An Adaptive Hybrid Coding Scheme for Hdtv and Digital Sequences", *IEEE Transacitons on Consumer Electronics*, vol. 42, No. 3,(Aug. 1995),926-936.

Kwok, Tung Lo "Predictive Mean Search Algorithms for Fast VQ Encoding of Images", *IEEE Transactions on Consumer Electronics*, vol. 41, No. 2,(May 1995),327-331.

Goel, James et al., "Pre-processing for Mpeg Compression Using Adaptive Spatial Filtering", *IEEE Transactions on Consumer electronics*, vol. 41, No. 3,(Aug. 1995),687-698.

Feng, Jian et al., "Motion Adaptive Classified Vector Quantization for Atm Video Coding", IEEE Transactions on Consumer Electronics vol. 41, No. 2,(May 1995),322-326.

Lan, Austin Y., et al., "Scene-Context Dependent Reference--Frame Placement for Mpeg Video Coding", *IEEE Transactions on Circuits and Systems for Video Technology*, vol. 9, No. 3,(Apr. 1999),478-489.

Fan, Kuo-Chin et al., "An Active Scene Analysis-Based approach for Pseudo constant Bit-Rate Video Coding", *IEEE Transactions on Circuits and Systems for Video Technology*, vol. 8, No. 2,(Apr. 1998),159-170.

Takashi, Ida et al., "Image Segmentation and Contour Detection Using Fractal Coding", *IEEE Transitions on Circuits and Systems for Video Technology*, vol. 8, No. 8,(Dec. 1998),968-975.

Liang, Shen "A Segmentation-Based Lossless Image Coding Method for High-Resolution Medical Image Compression", *IEEE Transactions on Medical Imaging*, vol. 16, No. 3,(Jun. 1997),301-316.

Munteanu, Adrian et al., "Wavelet-Based Lossless Compression of Coronary Angiographic Images", *IEEE Transactions on Medical Imaging*, vol. 18, No. 3,(Mar. 1999),272-281.

Okumura, Akira et al., "Signal Analysis and Compression performance Evaluation of Pathological Microscopic Images", *IEEE Transactions on Medical Imaging*, vol. 16, No. 6,(Dec. 1997),701-710.

Cheol, Hong M., et al., "A new adaptive quantization method to reduce blocking effect", *IEEE transaction on consumer electronics*, vol. 44, No. 3,(Aug. 1998),768-772.

Massimo, Mancuso et al., "Advanced pre/ post processing for DCT coded images", *IEEE transactions on consumer electronics*, vol. 44, No. 3,(Aug. 1998),1039-1041.

Tao, Chen "Adaptive postfiltering of transform coeffcients for the reduction of blocking artifacts", *IEEE transactions on circuits and systems for video technology*, vol. 11, No. 5,(May 2001),594-602.

Polesel, Andrea et al., "Image Enhancement Via Adaptive Unsharp Masking", *IEEE transactions on image processing*, vol. 9, No. 3,(Mar. 2000),505-510.

Olukayode, a et al., "An algorithm for integrated noise reduction and sharpness enhancement", *IEEE Transactions on Consumer Electronics*, vol. 46, No. 3,(Aug. 2000),474-480.

Sung- Hoon, Hong "Joint video coding of Mpeg-2 video programs for digital broadcasting services", *IEEE transactions on broadcasting*, vol. 44, No. 2,(Jun. 1998),153-164.

Lim, Jae "Two dimensional signal and image processing", *USA Simon & Schuster*, (1990),430.

Sherazain, et al., "U.S. Appl. No. 09/524,618", (Mar. 14, 2000).

Leonard, Eugene "Considerations regarding the use of digital data to generate video backgrounds", *SMPTE journal*, vol. 87(Aug. 1987),499-504.

Tescher, Andrew "Multimedia is the message", *IEEE signal processing magazine*, vol. 16, No. 1,(Jan. 1999),44-54.

Mancuso, et al., "A new post-processing algorithim to reduce artifacts in block coded images", *IEEE trans on consumer electronics*, vol. 43, No. 3,(Aug. 1997),303-307.

Yang, J et al., "Noise estimation for blocking artifacts reduction in DCT coded images", *IEEE trans on circuits and systems for video technology*, vol. 10, No. 7,(Oct. 2000),1116-1120.

Kuo, et al., "Adaptive postprocessor for block encoded images", *IEEE trans on circuits and systems for video technology*, vol. 5, No. 4,(Aug. 1995),298-304.

Min, et al., "A new adaptive quantization method to reduce blocking effect", *IEEE Trans on consumer electronics*, vol. 44, No. 3,(Aug. 1998),768-772.

Chan, "A practical postprocessing technique for real-time block-based coding sytem", *IEEE trans on circuits and systems for video technology*, vol. 8, No. 1,(Feb. 1998),4-8.

Liu, et al., "A new postprocessing technique for the block based DCT coding based on the convex-projection theory", *IEEE trans on consumer electronics*, vol. 4, No. 3,(Aug. 1998),1054-1061.

Lee, et al., "Efficient algorithm and architecture for post processor in HDTV", *IEEE trans on consumer electronics*, vol. 44, No. 1,(Feb. 1998),16-26.

Choung, et al., "A fast adaptive image restoration filter for reducing block artifact in compressed images", *IEEE trans on consumer electronics*, vol. 44, No. 1,(Nov. 1997),1340-1346.

Jeon, B et al., "Blocking artifacts reduction in image compression with block boundary discontinuity criterion", *IEEE trans on circuits and systems for video technology*, vol. 8, No. 3,(Jun. 1998),34557.

Zhong, et al., "Derivation of prediction equation for blocking effect reduction", *IEEE trans on circuits and systems for video technology*, vol. 9, No. 3,(Apr. 1999),415-418.

Meier, et al., "Reduction of blocking artifacts in image and video coding", *IEEE trans on cicuits and systems for video technology*, (Apr. 1999),490-500.

Kim, et al., "An advanced contrast enhancement using partially overlapped sub-block histogram equalization", *IEEE Trans on circuits and systems for video technology*, vol. 11, No. 4,(Apr. 2001),475-484.

Stark, Alex J., "Adaptive image contrast enhancement Enhancement using generalizations of histogram equalization", *IEEE trans on image processing*, vol. 9, No. 5,(May 2000),889-896.

Hier, et al., "Real time locally adaptive contrast enhancement; A practical key to overcoming display and human visual system limitation", *SID digest*, (1993),491-493.

"Notice of Allowance", U.S. Appl. No. 11/027,674, (Feb. 24, 2009),16 pages.

"Non Final Office Action", U.S. Appl. No. 12/196,180, (Apr. 2, 2009),17 pages.

"Restriction Requirement", U.S. Appl. No. 10/851,190, (May 19, 2009),8 pages

"Non Final Office Action", U.S. Appl. No. 12/316,168, (Jun. 24, 2009),11 pages.

"Notice of Allowance/Base Issue Fee", U.S. Appl. No. 11/027,674, (Jul. 23, 2009),6 pages.

"Non Final Office Action", U.S. Appl. No. 10/851,190, (Sep. 1, 2009), 8 pages.

"Notice of Allowance", U.S. Appl. No. 12/316,168, (Jan. 29, 2010), 8 pages.

"Notice of Allowance", U.S. Appl. No. 10/851,190, (Feb. 8, 2010), 4 pages.

"PCT Search Report & Written Opinion", WO/2006/011129, (Jul. 3, 2008), 6 pages.

"Final Office Action", U.S. Appl. No. 12/196,180, (Apr. 30, 2010), 5 pages.

"Notice of Allowance", U.S. Appl. No. 12/316,168, (Jun. 1, 2010), 9 pages.

"Notice of Allowability", U.S. Appl. No. 12/316,168, (Jun. 29, 2010), 7 pages.

"Notice of Allowance", U.S. Appl. No. 12/196,180, (Oct. 1, 2010), 4 pages.

* cited by examiner

ADAPTIVE IMAGE IMPROVEMENT

FIELD OF THE INVENTION

The present invention relates to still images generally and to their improvement in particular.

BACKGROUND OF THE INVENTION

Digital images are well known and are generated in many ways, such as from a digital camera or video camera (whether operated automatically or by a human photographer), or scanning of a photograph into digital format. The digital images vary in their quality, depending on the abilities of the photographer as well as on the selected exposure, the selected focal length and the lighting conditions at the time the image is taken.

Digital images may be edited in various ways to improve them. For example, the image may be sent through a processor which may enhance the sharpness of the image by increasing the strength of the high frequency components. However, the resultant image may have an increased level of noise, spurious oscillations known as "ringing" which are caused by overshooting or undershooting of signals and image independent sharpness enhancement that results in an incorrect change in sharpness.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
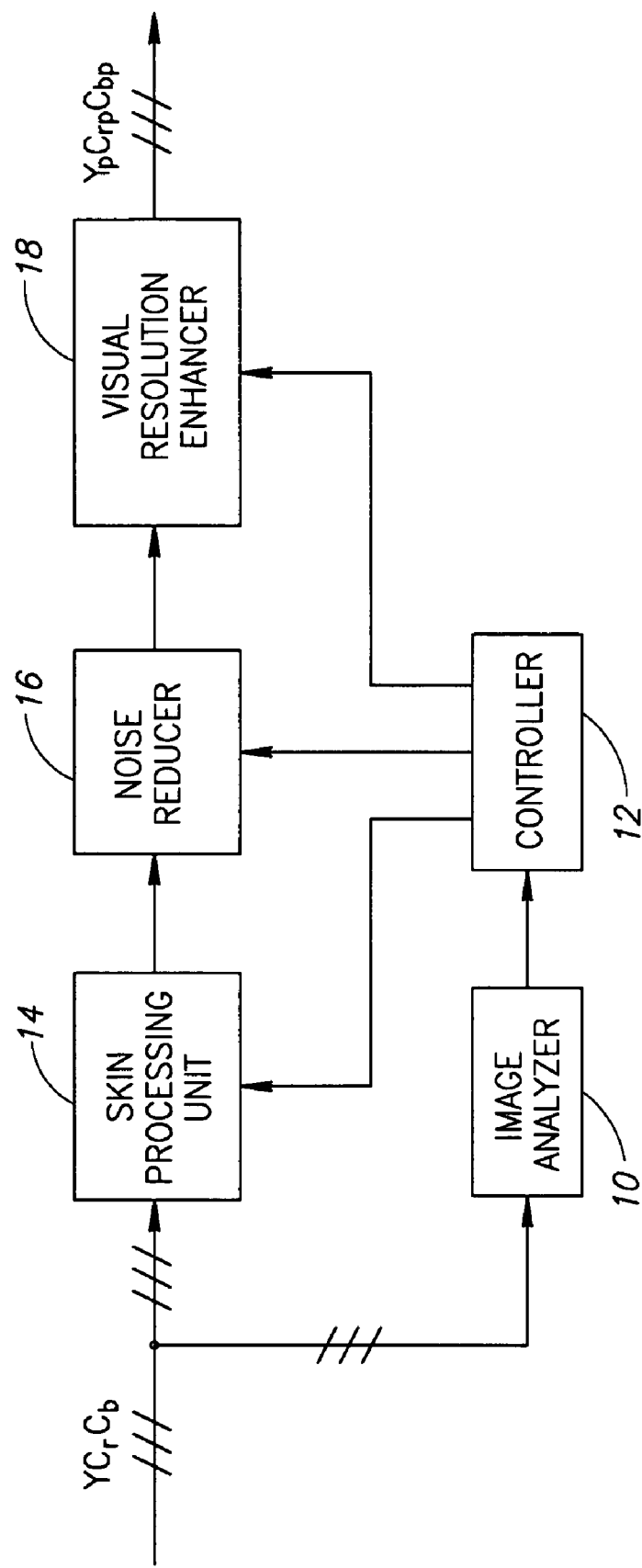
FIG. 1 is a block diagram illustration of an adaptive image improvement system, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which illustrates an adaptive image improvement system, constructed and operative in accordance with the present invention. The system of the present invention may compensate for the differences between how an image sensor, such as a video camera, views an object and how the human visual system views the same object, producing an image that generally is pleasing to people. The present invention may be operative to improve on the output of digital still cameras, printers, internet video, etc.

In particular, the system of FIG. 1, which may comprise an image analyzer 10, a controller 12, a human skin processing unit 14, a noise reducer 16 and a visual resolution enhancer 18, may operate, at least in part, to improve images, indicated by ($YC_r C_b$), as well as to minimize the undesired effects of common processing operations.

For example, Applicants have realized that the details of human skin generally should be sharpened less than other details. Moreover, for low light exposures, image sensors typically generate human skin areas which are significantly redder than as seen by the human visual system. To handle both of these issues, image analyzer 10 may detect areas of human skin in the input image. Human skin processing unit 14 may reduce the saturation of the detected areas of human skin in the image, thereby to reduce the redness of the skin, and visual resolution enhancer 18 may change the high frequency components of areas of the detected human skin to attempt to reduce the sharpness of those areas in the final image.

Applicants have further realized that the 'ringing' effect may occur because the processing may change the intensities of objects or details in the input image so much that they 'overshoot' or 'undershoot' the intensities that originally were in the object. Applicants have realized that the overshooting and undershooting may be reduced by diminishing the intensity levels of those high frequency components whose intensity levels are above, respectively, a threshold.

Furthermore, Applicants have realized that the amount of texture on the details of the image is an important parameter for the sharpness of low contrast, small details. Therefore, in accordance with a preferred embodiment of the present invention, image analyzer 10 may determine the texture level in the details of the image and visual resolution enhancer 18 may operate to increase them if necessary.

Image analyzer 10 may detect areas of human skin in the input image, and may estimate the amount of low contrast, small details (texture) in the image. Image analyzer 10 may generate an indication of duration of edges at each pixel. In addition, analyzer 10 may determine the locations of details of high brightness and of low brightness, since noise is generally more noticeable in blacker areas, which have low light. Controller 12 may use the analysis to determine a set of parameters to control units 14, 16 and 18. Some of these parameters are global, others are per pixel parameters.

Using the parameters produced by controller 12, skin processing unit 14 may process the areas of the input image which have skin in them. For low light exposures, areas of human skin may be oversaturated (i.e. the chrominance of such areas may be too high relative to the luminance components). Accordingly, skin processing unit 14 may reduce the chrominance values of such areas. It will be appreciated that an image with no human features in it would pass through unit 14 unedited.

Once the skin details have been processed, noise reducer 16 may reduce the noise in the high frequency components to provide sharpness enhancement without an increase in the visibility of the noise. Finally, visual resolution enhancer 18 may sharpen the output of noise reducer 16 and may operate to increase the spatial depth of the image, as well as its field of view, producing the processed image, indicated by ($Y_p$, $C_{rp}$, $C_{bp}$).

Figure 2:
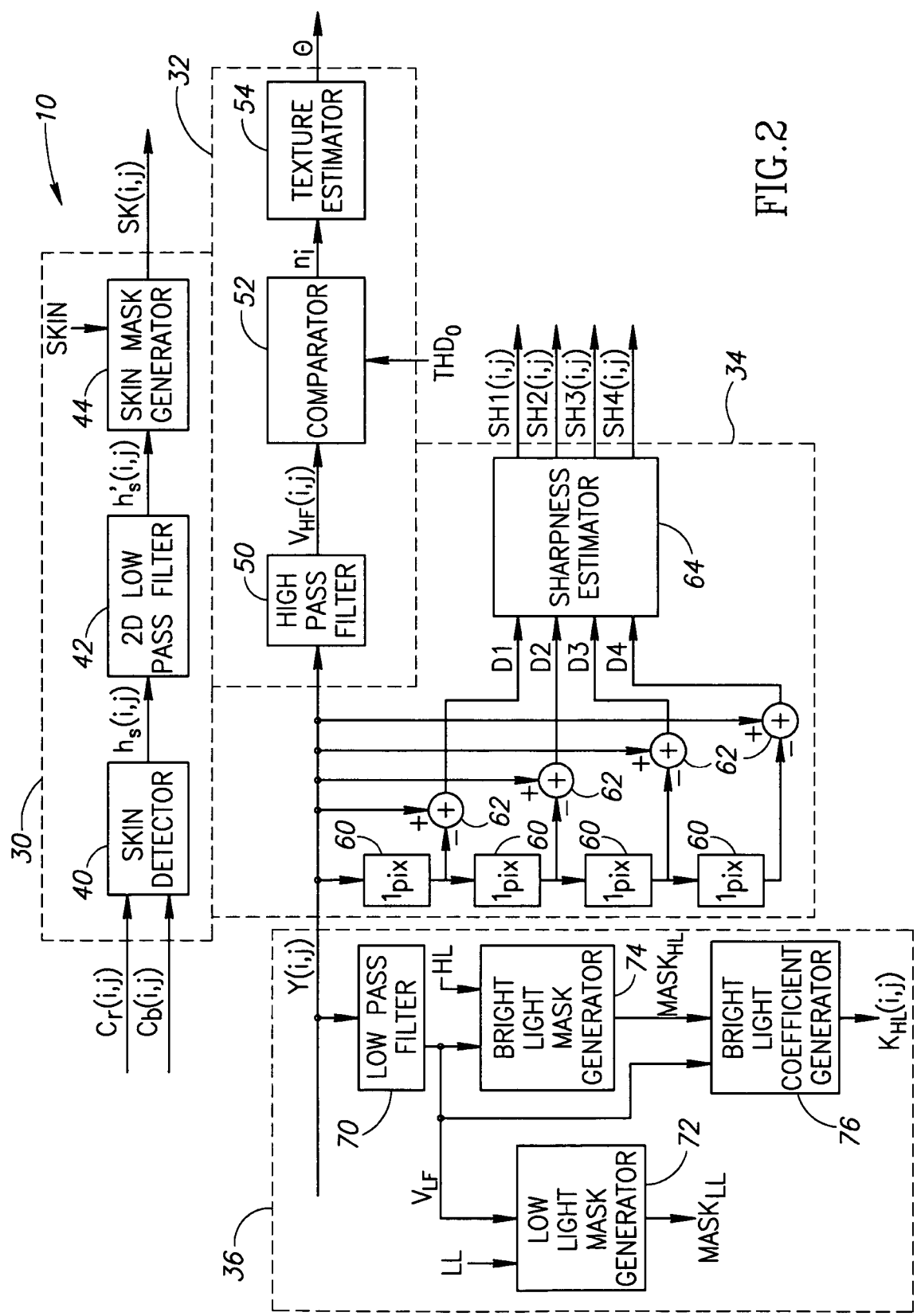
FIG. 2 is a block diagram illustration of an image analyzer forming part of the system of FIG. 1.

Reference is now made to FIG. 2, which illustrates an exemplary embodiment of image analyzer 10, constructed and operative in accordance with the present invention. In this embodiment, analyzer 10 may comprise a skin analyzer 30, a texture analyzer 32, a sharpness analyzer 34 and a brightness analyzer 36.

Skin analyzer 30 may determine the presence of human skin in the image and may generate a mask SK(i,j) marking the locations of the skin. Skin analyzer 30 may comprise a skin detector 40, a 2D low pass filter 42 and a skin mask generator 44.

Applicants have discovered empirically that most skin, except those with very high pigment levels, have chrominance levels within specific dynamic ranges. Thus, skin detector 40 may analyze the chrominance signals $C_r(i,j)$ and $C_b(i,j)$ as follows to determine the location $h_s(i,j)$ of not very dark human skin:

$$h_s(i,j) = \begin{cases} 1 & \text{if } \frac{C_b(i,j)}{C_s(i,j)} \in D_s \text{ and } C_r(i,j) \in D_{rs} \text{ and } C_b(i,j) \in D_{bs} \\ 0 & \text{otherwise} \end{cases}$$

where $D_s$, $D_{rs}$ and $D_{bs}$ are the dynamic ranges for most human skin for $$\frac{C_b}{C_r},$$

Figure 6:
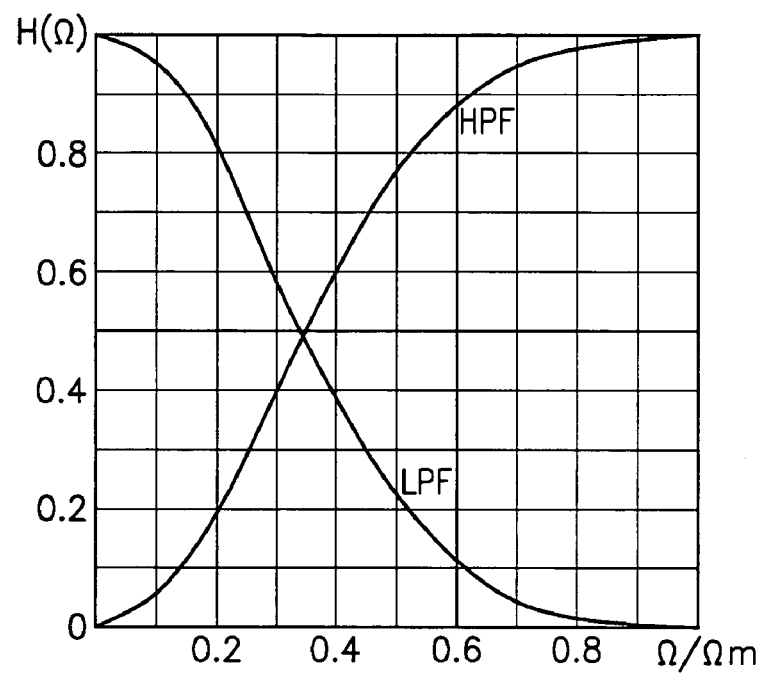
FIG. 6 is a graphical illustration of the response of low and high pass filters, useful in the system of FIG. 1.

$C_r$ and $C_b$, respectively. Applicants have determined empirically that, for many images:

$D_s = \{0.49, \ldots 0.91\}$ $D_{rs} = \{89, \ldots, 131\}$ $D_{bs} = \{144, \ldots 181\}$ 2D low pass filter 42 may be any suitable low pass filter and may filter the signal $h_s$ to remove noise and any random pixels, such as may come from non-skin areas that happen to meet the criteria but are not skin. An exemplary response for low pass filter 42 may be seen in FIG. 6, to which reference is now briefly made. FIG. 6 also shows an exemplary response for high pass filters which may be used in the present invention.

Finally, skin mask generator 44 may generate skin mask SK(i,j) to have a 1 in those locations where the filtered skin signal $h_s'$ is above a predetermined threshold SKIN (e.g. 3-5 quant (8 bit/pel)).

Since texture components are high frequency components of the luminance signal Y, texture analyzer 32 may comprise a high pass filter 50. An exemplary high pass filter may be that shown in FIG. 6. Analyzer 32 may also comprise a comparator 52 and a texture estimator 54. Comparator 52 may compare the high frequency signal $V_{HF}$ to a base threshold level $THD_0$. In one embodiment, base texture threshold level $THD_0$ is 3 σ, where σ is a noise dispersion level. For example, σ may be 1-2 quant (8 bit/pel).

For each pixel (i,j) whose $V_{HF}$ is below base texture threshold level $THD_0$, a variable $n_{i,j}$ may receive the value 1. The remaining pixels may receive a 0 value.

Texture estimator 54 may generate a global texture level θ defined as the percentage of pixels in the image below the texture threshold $THD_0$:

$$\theta = \frac{\sum_i \sum_j n_{i,j}}{N * M}$$

where N and M are the number of pixels in the horizontal and vertical directions, respectively.

Sharpness analyzer 34 may comprise four concatenated delays 60, four associated adders 62 and a sharpness estimator 64. A sharp image has edges of detail that change sharply from one pixel to the next. However, the edges in a blurry image occur over many pixels. Delays 60 and adders 62 may generate signals indicating how quickly changes occur.

Each delay 60 may shift the incoming luminance signal Y by one pixel (thus, the output of the fourth adder may be shifted by four pixels) and each adder 62 may subtract the delayed signal produced by its associated delay 60 from the incoming luminance signal Y. The resultant signals D1, D2, D3 and D4 may indicate how similar the signal is to its neighbors.

Sharpness estimator 64 may take the four similarity signals D1, D2, D3 and D4 and may determine a maximum value Dmax of all the signals D1, D2, D3 and D4, and may determine four per pixel signals SH1(i,j), SH2(i,j), SH3(i,j) and SH4(i,j) indicating that the edge duration at that pixel is 1, 2, 3 or 4 pixels, respectively, as follows:

SH1(i,j)=1 if D1(i,j)=Dmax

SH2(i,j)=1 if D2(i,j)=Dmax

SH3(i,j)=1 if D3(i,j)=Dmax

SH4(i,j)=1 if D4(i,j)=Dmax

Finally, brightness analyzer 36 may determine the locations of low and bright light and may comprise a low pass filter 70, a low light mask generator 72, a bright light mask generator 74 and a bright light coefficient definer 76. Low pass filter 70 may be any suitable low pass filter, such as that shown in FIG. 6, and may generate a low frequency signal $V_{LF}$. Low light mask generator 72 may review low frequency signal $V_{LF}$ to determine the pixels therein which have an intensity below a low light threshold LL. For example, LL might be 0.3 $Y_{max}$, where $Y_{max}$ is the maximum allowable intensity value, such as 255. Generator 72 may then generate a mask $MASK_{LL}$ with a positive value, such as 255, for each of the resultant pixels.

Bright light mask generator 74 may operate similarly to low light mask generator 72 except that the comparison is to a bright light threshold HL above which the intensities should be and the mask may be $MASK_{HL}$. For example, threshold HL might be 0.7 $Y_{max}$. Bright light coefficient generator 76 may generate a per pixel coefficient $K_{HL}(i,j)$ as follows:

$$K_{HL}(i,j) = \left[1 + \frac{Y(i,j)}{Y_{max}}\right] MASK_{HL}(i,j)$$

Per pixel coefficient $K_{HL}(i,j)$ may be utilized to increase sharpness for bright light pixels.

Figure 3:
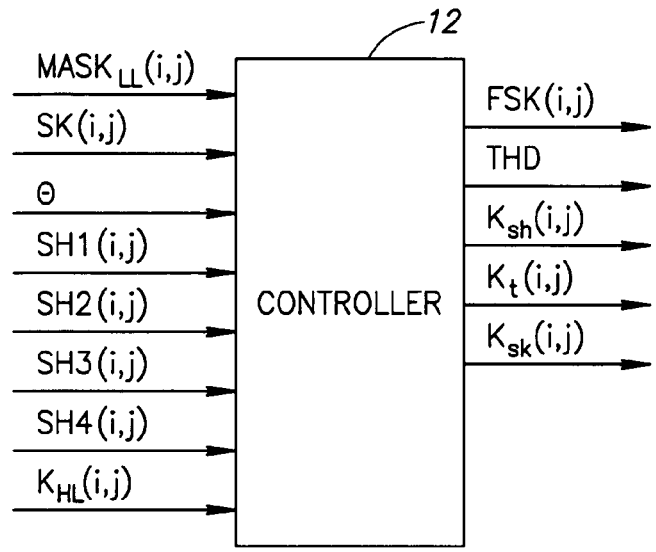
FIG. 3 is a block diagram illustration of a controller forming part of the system of FIG. 1.

Reference is now made to FIG. 3, which illustrates the operation of controller 12. Controller 12 may convert the parameters of analyzer 10 into control parameters for human skin processing unit 14, noise reducer 16 and visual resolution enhancer 18.

Controller 12 may generate a low light skin mask $FSK(i,j)$ which combines both skin mask SK and low light mask $MASK_{LL}$. In the present invention, only those pixels which both relate to skin and are in low light may be processed differently. Thus, low light skin mask $FSK(i,j)$ may be generated as:

$$FSK(i,j) = SK(i,j) * MASK_{LL}(i,j)$$

Controller 12 may generate a visual perception threshold THD above which the human visual system may be able to distinguish details. In this embodiment, the details are texture details or contrast small details. Since this threshold is a function of the amount θ of texture in the image, the threshold may be generated from base threshold THDo as follows:

$$THD = THD_0(1+\theta)$$

Controller 12 may determine a per pixel, visual resolution enhancement, texture coefficient $K_t(i,j)$. This coefficient affects the high frequency components of the image which may be affected by the amount of texture θ as well as the brightness level $K_{HL}$ and may operate to increase the spatial depth and field of view of the image.

$$K_t(i,j) = \begin{cases} K_{t0}\left(1 - \frac{\theta}{2}\right)K_{HL}(i,j) & \text{if } MASK_{HL}(i,j) = 1 \\ K_{t0}\left(1 - \frac{\theta}{2}\right) & \text{if } MASK_{HL}(i,j) = 0 \end{cases}$$

where $K_{t0}$ may be a minimum coefficient level defined from a pre-defined, low noise image. For example, $K_{t0}$ may be 2-3.

Another per pixel, visual resolution enhancement coefficient, $K_{sh}(i,j)$, may operate to improve sharpness. Through sharpness coefficient $K_{sh}$, the high frequency components of blurry edge pixels may be increased, thereby sharpening them. The sharpening level is higher for blurry edges and lower for already sharp edges. Controller 12 may generate a preliminary matrix $K_s(i,j)$ from the sharpness estimates SH1, SH2, SH3 and SH4, as follows:

$$K_s(i,j) = \begin{cases} C_4 K_{sh0} & \text{if } SH4(i,j) = 1 \\ C_3 K_{sh0} & \text{if } SH3(i,j) = 1 \\ C_2 K_{sh0} & \text{if } SH2(i,j) = 1 \\ C_1 K_{sh0} & \text{if } SH1(i,j) = 1 \\ C_0 & \text{otherwise} \end{cases}$$

where $K_{sh0}$ may be a maximum coefficient level defined from a pre-defined, low noise image. For example, $K_{sh0}$ may be 2 ... 4. The $C_i$ may be higher for blurry edges (e.g. SH4=1) and lower for sharper edges (e.g. SH1=1). For example:

$$C_i = \{0, 0.25, 0.5, 0.75, 1\}, i = 0 \ldots 4$$

Controller 12 may produce the final coefficient $K_{sh}(i,j)$ by including the effects of brightness (in matrix $K_{HL}(i,j)$) to preliminary coefficient $K_s(i,j)$:

$$K_{sh}(i,j) = \begin{cases} K_s(i,j) * K_{HL}(i,j) & \text{if } MASK_{HL} = 1 \\ K_s(i,j) & \text{if } MASK_{HL} = 0 \end{cases}$$

Controller 12 may generate a skin blurring mask $K_{sk}$ for visual resolution enhancer 18. Wherever skin mask $SK(i,j)$ indicates that the current pixel has skin in it, skin blurring mask $K_{sk}(i,j)$ may have a reduction coefficient, as follows:

$$K_{sk}(i,j) = \begin{cases} K_{sk0} SK(i,j) & \text{if } SK(i,j) = 1 \\ 1 & \text{if } SK(i,j) = 0 \end{cases}$$

where $K_{sk0}$ may be a desired sharpness reduction coefficient for human skin, such as 0.5.

Figure 4:
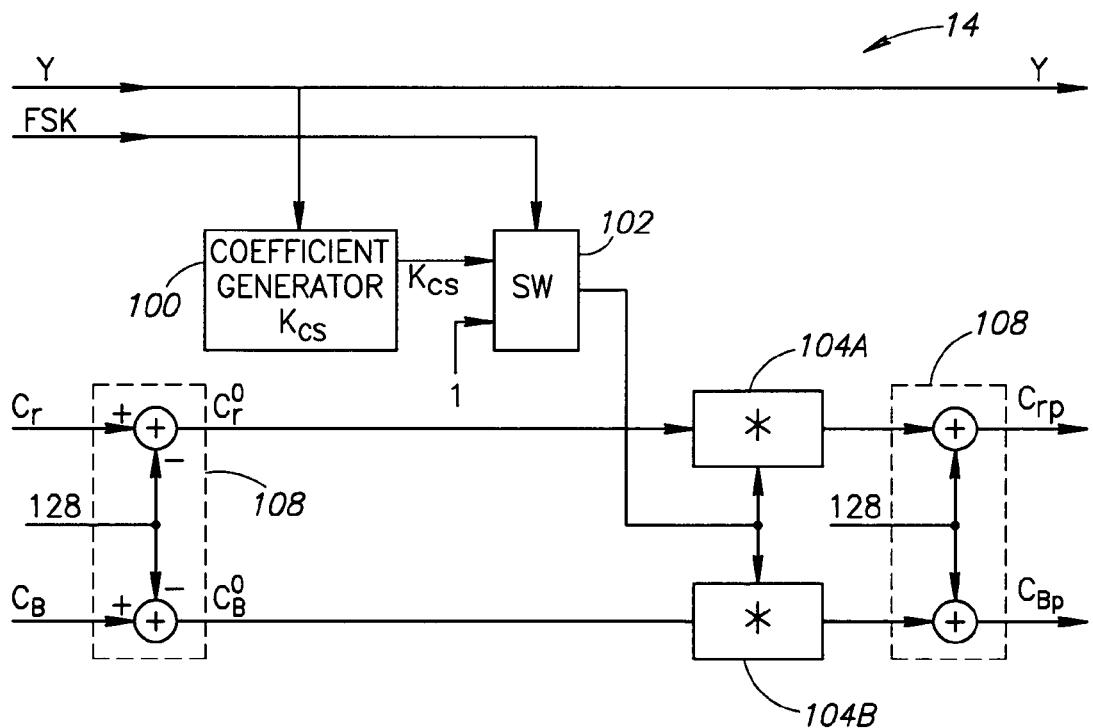
FIG. 4 is a block diagram illustration of a human skin processing unit forming part of the system of FIG. 1.
Figure 5:
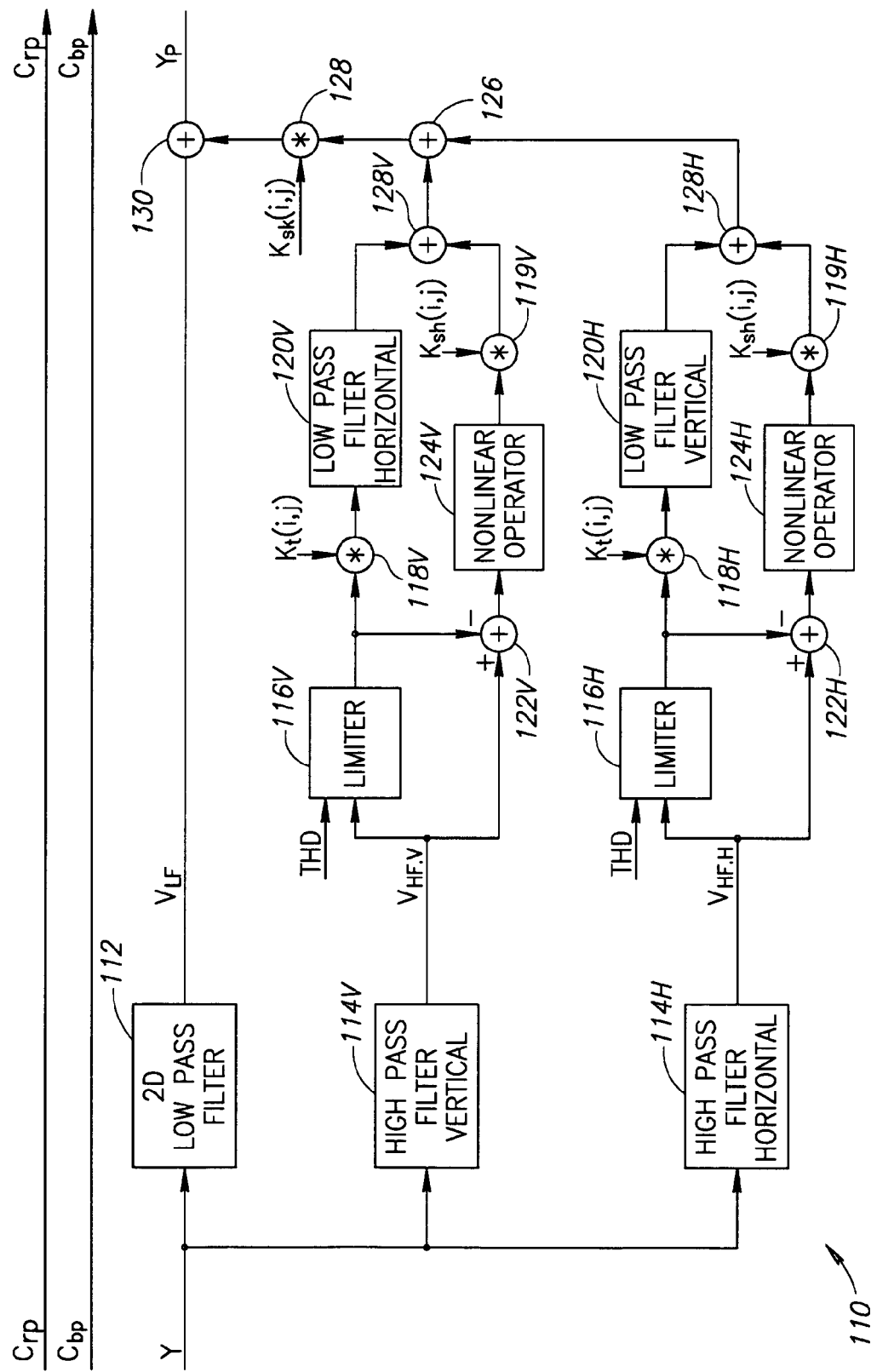
FIG. 5 is a block diagram illustration of a combined noise reducer and visual resolution enhancer, forming part of the system of FIG. 1.

With the control parameters FSK, THD, $K_{sh}$, $K_t$ and $K_{sk}$, controller 12 may control the operation of skin processing unit 14, noise reducer 16 and visual resolution enhancer 18. FIGS. 4 and 5 illustrate the operations of units 14, 16 and 18.

Reference is now made to FIG. 4, which illustrates the operation of skin processing unit 14. Unit 14 may operate to lower the saturation levels of areas of human skin. Since chrominance levels $C_r$ and $C_b$ represent the saturation in the input image, unit 14 may operate on them. However, in many systems, such as digital video broadcast systems, chrominance levels $C_r$ and $C_b$ have an offset value, such as of 128, which must be removed before processing. To that end, unit 14 may comprise an offset remover 106 to remove the offset, creating signals $C_{r0}$ and $C_{b0}$, and an offset restorer 108 to restore it. The improved chrominance signals may be noted as $C_{rp}$ and $C_{bp}$.

In addition, unit 14 may comprise a coefficient generator 100, a switch 102 and two multipliers 104A and 104B. Coefficient generator 100 may generate a color saturation coefficient $K_{cs}$, to change the saturation of skin pixels, as follows:

$$K_{cs}(i,j) = K_{cs0}\left(1 - \frac{Y(i,j)}{0.3 Y_{max}}\right) + \frac{Y(i,j)}{0.3 Y_{max}}, 0 \leq Y(i,j) \leq 0.3 Y_{max}$$

where $K_{cs0}$ is a minimum human skin saturation level, such as 0.7.

Switch 102 may select the amplification for multipliers 104 for the current pixel (i,j). When low light skin mask $FSK(i,j)$ indicates that the current pixel has both a low light level and skin in it (i.e. $FSK(i,j)=1$), then switch 102 may provide the color saturation coefficient $K_{cs}(i,j)$ for the current pixel. Otherwise, switch 102 may provide a unity value (e.g. 1) to multipliers 104. Thus, when the current pixel (i,j) has skin in it, skin processing unit 14 may change its saturation level by changing the intensity levels of chrominance signals $C_{r0}$ and $C_{b0}$.

Reference is now made to FIG. 5, which illustrates a combined noise reducer and visual resolution enhancer, labeled 110, which operates on the luminance signal Y. Unit 110 does not affect chrominance signals $C_{rp}$ and $C_{bp}$ produced by skin processing unit 14 since, as is well-known, image sharpness may be defined by the luminance signal Y.

Unit 110 may divide luminance signal Y into three channels, a low frequency channel (using a 2D low pass filter 112, such as that of FIG. 6) and two high frequency channels, one for the vertical direction (using a high pass filter 114V, such as that of FIG. 6) and one for the horizontal direction (using a high pass filter 114H, such as that of FIG. 6).

For each high frequency channel, there is a limiter 116, two multipliers 118 and 119, a low pass filter 120, two adders 122 and 123 and a non-linear operator 124.

Figure 7:
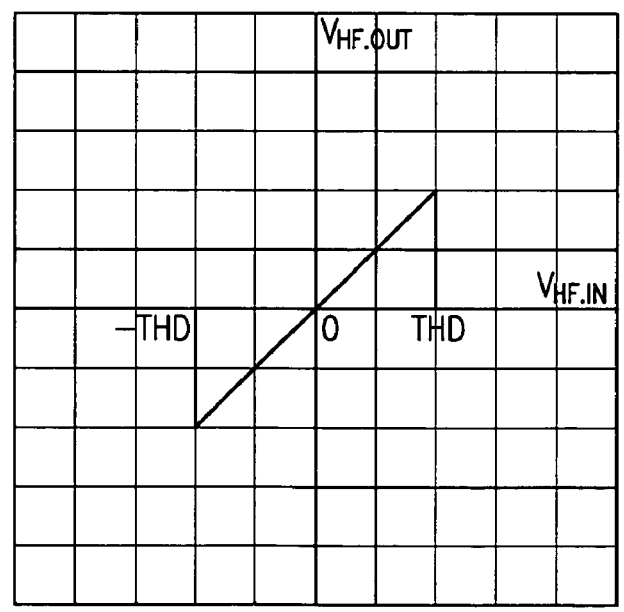
FIG. 7 is a graphical illustration of the response of a limiter useful in the combined noise reducer and visual resolution enhancer of FIG. 5.

Each limiter 116 may have any suitable amplitude response. An exemplary amplitude response may be that shown in FIG. 7, to which reference is now briefly made, in which the output is linear until the threshold level THD (where threshold THD is an input from controller 12) at which point the output is null (e.g. 0).

Since threshold level THD is a texture threshold, each limiter 116 may select those texture details, which are low contrast, small details found in the high frequency signal $V_{HF}$, which the human eye may only detect. Adders 122 may subtract the limited signal from the high frequency signal $V_{HF}$ to generate signals with contrasting small details that may also be distinguished by the human eye.

Non-linear operators 124 may operate on the signals with the distinguishable small details, output from adders 122, to reduce their intensity levels so as to reduce the possibility of over/undershooting after sharpness enhancement. Non-linear operators 124 may more strongly reduce high levels of the signal than lower levels of the signals. For example, the multiplication coefficients may be defined as follows:

$$K_{NL}(i, j) = 1 - (1 - K_{NL0}) \frac{V_{in}(i, j)}{V_{in,\max}}$$

where $V_{in}(i,j)$ may be the input signal to operators 124, $V_{in,max}$ may be the maximum possible value of $V_{in}$, such as 255, and, $K_{NL0}$ may be a user defined value to provide protection against ringing. In one embodiment, $K_{NL0}$ might be 0.

Multipliers 119 may change values per pixel, as per the information provided by parameter $K_{sh}(i,j)$, and may provide sharpness enhancement to the output of non-linear operators 124.

The texture signals generated by limiters 116 may be further processed by multiplier 118, using per pixel, enhancement coefficient $K_t(i,j)$. Since such amplification may increase the noise level, the output of multipliers 118 may then be processed through low pass filters 120 to reduce the noise level. It is noted that low pass filter 120H of the horizontal channel is a vertical low pass filter and low pass filter 120V of the vertical channel is a horizontal low pass filter.

Unit 110 may then add the processed texture signals with the sharpened distinguished signals in adders 123 to produce the high frequency horizontal and vertical components. Unit 110 may then add these high frequency components together in an adder 126. The resultant high frequency signal may be processed, in a multiplier 128, to reduce the sharpened high frequency signals for those pixels with skin in them. The reduction coefficient for multiplier 128 may be skin blurring mask $K_{SK}(i,j)$.

An adder 130 may add the processed high frequency components to the low frequency components (output of low pass filter 112) together to provide an improved luminance signal $Y_p$.

It will be appreciated that the improved signals ($Y_p$, $C_{rp}$, $C_{bp}$) may provide a sharpened image which is more pleasant to the human eye than those of the prior art. The output of the present invention may be sharpened but it may have little or no ringing, little or no overly sharpened skin details and reduced noise.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
   an image analyzer to measure a blurriness level in an input image, said image analyzer comprising a sharpness detector configured to indicate blurriness of one or more edges of the input image over a range of one or more pixels; and
   a processing unit configured to sharpen said input image using said blurriness level, said processing unit comprising a coefficient generator configured to utilize output of said sharpness detector to generate one or more pixel sharpening coefficients.

2. The system of claim 1, wherein said one or more pixel sharpening coefficients are a function of an edge's duration over one or more pixels.

3. The system of claim 2, wherein said one or more pixel sharpening coefficients comprise at least two different pixel sharpening coefficients, each of said at least two different pixel sharpening coefficients being associated with a different input image location brightness.

4. The system of claim 1, said processing unit further comprising a multiplier configured to multiply high frequency components of said input image by at least one of said one or more pixel sharpening coefficients.

5. A method comprising:
   measuring a blurriness level in an input image, said measuring comprising indicating blurriness of one or more edges of the input image over a range of one or more pixels; and
   processing said input image, using said blurriness level, at least to sharpen said input image, said processing comprising generating, based at least in part on said blurriness level, one or more pixel sharpening coefficients.

6. The method according to claim 5, wherein said one or more pixel sharpening coefficients are a function of an edge's duration over one or more pixels.

7. The method according to claim 6, wherein said one or more pixel sharpening coefficients comprise at least two different pixel sharpening coefficients, each of said at least two different pixel sharpening coefficients being associated with a different input image location brightness.

8. The method of claim 5, said processing further comprising multiplying high frequency components of said input image by at least one of said one or more pixel sharpening coefficients.

9. A system comprising:
   an image analyzer configured to do one or both of:
     measure a blurriness level in an input image and, based at least in part on a measured blurriness level, determine at least a first parameter; or
     identify areas of bright light in said input image and, based at least in part on said areas of bright light, determine at least a second parameter; and
   a processing unit configured to sharpen said input image based on one or both of said first or second parameters, said processing unit comprising a coefficient generator configured to generate one or more pixel sharpening coefficients utilizing one or both of said first or second parameters.

10. The system of claim 9, wherein said image analyzer comprises a sharpness detector configured to indicate blurriness of one or more edges of the input image over a range of one or more pixels.

11. The system of claim 9, wherein said processing unit further comprises a multiplier configured to multiply high frequency components of said input image by at least one of said one or more pixel sharpening coefficients.

12. The system of claim 9, wherein said second parameter is associated with a bright light mask for pixels of said input image at or above a predefined bright light level.

13. The system of claim 12, wherein said coefficient generator is further configured to generate one or more pixel sharpening coefficients for said pixels of said input image at or above said predefined bright light level.

14. A method comprising:
    analyzing an input image, wherein analyzing comprises one or both of measuring a blurriness level in said input image or identifying an area of bright light in said input image;
    determining one or more parameters based on said analyzing; and
    changing a sharpness of said input image based at least in part on said one or more parameters, wherein said changing comprises generating one or more pixel sharpening coefficients utilizing at least one of said one or more parameters.

15. The method of claim 14, wherein said changing further comprises multiplying high frequency components of said input image by at least one of said one or more pixel sharpening coefficients.

16. The method of claim 14, wherein at least one of said one or more parameters is associated with a bright light mask for pixels of said input image at or above a predefined bright light level.

17. The method of claim 16, wherein said changing further comprises generating one or more pixel sharpening coefficients for said pixels of said input image at or above said predefined bright light level.

* * * * *

UNITED STATES PATENT AND TRADEMARK OFFICE
CERTIFICATE OF CORRECTION

| | |
|---|---|
| PATENT NO. | : 7,903,902 B2 |
| APPLICATION NO. | : 10/898557 |
| DATED | : March 8, 2011 |
| INVENTOR(S) | : Sheraizin et al. |

It is certified that error appears in the above-identified patent and that said Letters Patent is hereby corrected as shown below:

Page 2, item (56), under "U.S. Patent Documents", in Column 2, Line 15, delete "2001/0000354 A1 4/2001 Nazerian et al." and insert -- 2001/0003545 A1 06/2001 Hong --.

Page 2, item (56), under "U.S. Patent Documents", in Column 2, Line 18, delete "2002/0104854" and insert -- 2002/0140854 --.

Page 2, item (56), under "Other Publications", in Column 2, Line 9, delete "Paking" and insert -- Peaking --.

Page 3, item (56), under "Other Publications", in Column 1, Line 17, delete "Transacitons" and insert -- Transactions --.

Page 3, item (56), under "Other Publications", in Column 1, Line 26, delete "Electronics" and insert -- Electronics, --.

Page 3, item (56), under "Other Publications", in Column 1, Line 54, delete "coeffcients" and insert -- coefficients --.

Page 3, item (56), under "Other Publications", in Column 1, Line 60, delete "Olukayode, a" and insert -- Olukayode, A --.

Page 3, item (56), under "Other Publications", in Column 2, Line 3, delete "algorithim" and insert -- algorithm --.

Page 3, item (56), under "Other Publications", in Column 2, Line 16, delete "sytem"," and insert -- system", --.

Page 3, item (56), under "Other Publications", in Column 2, Line 34, delete "cicuits" and insert -- circuits --.

Signed and Sealed this
Twenty-eighth Day of June, 2011

David J. Kappos
*Director of the United States Patent and Trademark Office*

Page 3, item (56), under "Other Publications", in Column 2, Line 40, delete "enhancement Enhancement" and insert -- enhancement --.